G. O. CURME, Jr.
METHOD OF PREPARATION OF PURE ETHYLENE.
APPLICATION FILED JUNE 3, 1916. RENEWED OCT. 2, 1917.
1,315,541.  Patented Sept. 9, 1919.
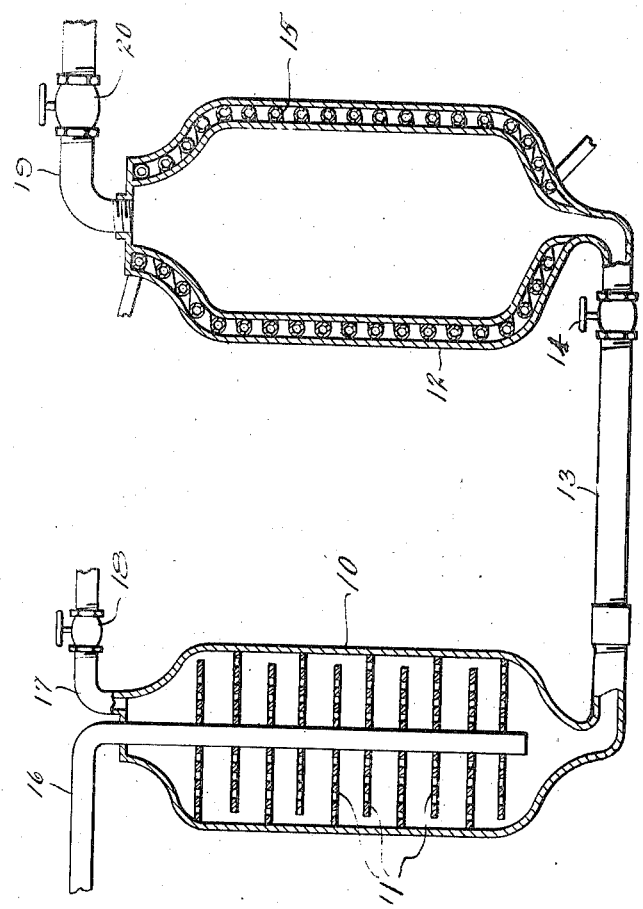

UNITED STATES PATENT OFFICE.

GEORGE O. CURME, JR., OF PITTSBURGH, PENNSYLVANIA, ASSIGNOR, BY MESNE ASSIGNMENTS, TO UNION CARBIDE COMPANY, OF NEW YORK, N. Y., A CORPORATION OF VIRGINIA.

METHOD OF PREPARATION OF PURE ETHYLENE.

1,315,541.      Specification of Letters Patent.     Patented Sept. 9, 1919.

Application filed June 3, 1916, Serial No. 101,636. Renewed October 2, 1917. Serial No. 194,300.

*To all whom it may concern:*

Be it known that I, GEORGE O. CURME, Jr., a citizen of the United States, residing at Pittsburgh, Allegheny county, and State of Pennsylvania, have invented and discovered certain new and useful Improvements in Methods of Preparation of Pure Ethylene, of which the following is a specification.

In the manufacture of acetylene from organic liquids, various valuable by-products are formed, which I have discovered are capable of separation and utilization.

Among the by-products of value, one of the most important is ethylene, and my present invention consists in the method of separating and recovering the ethlyene in a pure, or substantially pure, state, and in the apparatus for carrying out said method.

The apparatus illustrated in the accompanying drawing which is made a part hereof, is intended merely as one type of apparatus which has been found suitable for the purpose, and it will be understood that any other form of apparatus capable of carrying out the process may be substituted and used without departing from the spirit and scope of my invention.

Said apparatus comprises a vessel 10, provided with horizontal baffle plates 11, perforated and arranged with passages at opposite ends of alternate plates, the plates being a suitable distance apart, whereby a serpentine passage is provided from the bottom to the top of the vessel. This construction of device in itself, for various purposes, is of a well-known type and needs no particular description, its use being merely to secure intimate contact between the gases and the liquid, which purpose can be equally well served by other devices. A second vessel 12 is connected with vessel 10 by a pipe 13, in which is mounted a valve 14 for controlling the flow from one vessel to the other. Vessel 12 is preferably formed with double spaced walls, and a steam or heating coil 15 is mounted within the chamber formed by said walls. Inlet pipe 16 leads through the top of vessel 10 to a point near the bottom thereof, and a discharge pipe 17, with a valve 18, is also connected with the top of said vessel. A discharge pipe 19, having a valve 20, is connected with the top of vessel 12.

It has been found that mercury salts in acid or neutral aqueous solution, when at ordinary temperatures, will take up ethylene from gaseous mixtures containing the same, forming a compound of the empirical formula; *e. g.*, where mercuric sulfate is concerned, $HgSO_4.C_2H_4$. The most convenient temperature is between 0° C. and 25° C., although higher and lower temperatures may also be used advantageously. The aqueous solution of this compound, when heated to boiling, will give off the ethylene again as such in a pure condition.

In the practice of my invention, I have, therefore, provided the apparatus above described and herein illustrated, in vessel 10 of which I place an aqueous solution of mercuric, or mercurous, salt in neutral or acid solution, with or without excess of undissolved mercury salt. The gaseous mixture containing the ethylene is passed through pipe 16 into said vessel 10 thus filled with this solution. Said gaseous mixture is discharged from the lower end of said pipe 16 into the space in vessel 10 below the lowermost baffle plate, and is bubbled up through the mercury solution, the current of the gas stream being established to travel back and forth from side to side of the vessel between and through the baffle plates, and thus come into intimate contact with the largest possible area of the mercury solution, which absorbs or takes up the ethylene until no more is left in the mixture, the waste gases passing out through pipe 17. When the solution has been thus charged to its full capacity, valve 18 is closed and the contents of vessel 10 is forced into vessel 12, valve 14 being opened for the purpose. After vessel 12 has received the contents of vessel 10, valve 14 is closed and vessel 12 heated through the medium of the heating coil 15, valve 20 is opened, and the pure ethylene is liberated and driven off by the heat, through pipe 19, to an appropriate container (not shown).

The mercury solution is then returned to vessel 10 and the operation repeated indefinitely with fresh portions of the gaseous mixture.

It will be understood, of course, that instead of a single set of vessels, the apparatus may comprise any number in battery or series arrangement, as may be desired, depending on such factors as quantity, temperature, velocity of gas, etc.

By means of this method and apparatus, I am able to separate the valuable ethylene from the gaseous mixture containing the same, and recover it in pure form for utilization, and at comparatively small expense.

Having thus fully described my said invention, what I claim as new and desire to secure by Letters Patent, is:

1. The process of separating ethylene from a gaseous mixture containing the same which consists in passing the mixture through a vessel containing a solution of mercury salt, drawing off the gases not combining with the mercury salt, and then heating the combined mercury salt solution and ethylene to a temperature to break down the compound and liberate the ethylene, substantially as set forth.

2. The process of separating ethylene from a gaseous mixture containing the same which consists in passing the mixture through an aqueous solution of mercury salt containing acid, drawing off the gases not combining with the salt, and then heating the solution to liberate the ethylene, substantially as set forth.

3. The process of separating ethylene from a gaseous mixture containing the same which consists in passing the mixture through a vessel containing a solution of mercuric sulfate, drawing off the gases not combining therewith, then heating the combined mercuric sulfate and ethylene to a temperature to break down the compound and liberate the ethylene, substantially as set forth.

4. The process of separating ethylene from a gaseous mixture containing the same which consists of passing the mixture through an aqueous solution of mercuric sulfate containing sulfuric acid, drawing off the gases not combining therewith, and then heating the solution to liberate the ethylene, substantially as set forth.

5. The process of separating ethylene from a gaseous mixture containing the same which consists in passing the mixture through a vessel containing a solution of mercury salt, transferring the solution with the combined ethylene to another vessel, and heating the same to liberate the ethylene.

6. The process of separating ethylene from a gaseous mixture containing the same which consists in passing the mixture through a vessel containing a solution of mercury salt, transferring the combined ethylene and mercury salt solution to another vessel, heating said other vessel to liberate the ethylene, returning the mercury salt to the first named vessel, and repeating the operation continuously, substantially as set forth.

7. The process of separating ethylene from a gaseous mixture containing the same which consists in passing the mixture into a vessel containing a solution of mercury salt until said mercury salt solution has taken up the ethylene, drawing off the other gases, transferring the combined ethylene and mercury salt solution to another vessel, heating said other vessel to liberate the ethylene, drawing off the pure ethylene, and returning the mercury salt solution to the first named vessel for further use.

In witness whereof, I have hereunto set my hand and seal at Washington, District of Columbia, this twenty-ninth day of May, A. D. nineteen hundred and sixteen.

GEORGE O. CURME, Jr. [L. S.]

Witnesses:
E. W. BRADFORD,
CHAS. E. RIORDON.